US010020739B2

(12) United States Patent
Lopata et al.

(10) Patent No.: US 10,020,739 B2
(45) Date of Patent: Jul. 10, 2018

(54) INTEGRATED CURRENT REPLICATOR AND METHOD OF OPERATING THE SAME

(71) Applicant: Altera Corporation, San Jose, CA (US)

(72) Inventors: Douglas Dean Lopata, Boyertown, PA (US); Jeffrey Demski, Orefield, PA (US); Jay Norton, Wind Gap, PA (US); Miguel Rojas-Gonzalez, Bedminster, NJ (US)

(73) Assignee: Altera Corporation, San Jose, CA (US)

( * ) Notice: Subject to any disclaimer, the term of this patent is extended or adjusted under 35 U.S.C. 154(b) by 820 days.

(21) Appl. No.: 14/227,666

(22) Filed: Mar. 27, 2014

(65) Prior Publication Data

US 2015/0280558 A1 Oct. 1, 2015

(51) Int. Cl.
*H02M 3/158* (2006.01)
*H02M 1/00* (2006.01)

(52) U.S. Cl.
CPC ......... *H02M 3/1588* (2013.01); *H02M 3/158* (2013.01); *H02M 2001/0009* (2013.01)

(58) Field of Classification Search
CPC .. H02M 3/156; H02M 3/1588; H02M 3/1584; H02M 3/158; H02M 3/157;
(Continued)

(56) References Cited

U.S. PATENT DOCUMENTS 4,761,725 A     8/1988  Henze
4,901,031 A  *  2/1990  Kalthoff ............. H03F 3/45278
                                                    330/253
(Continued)

FOREIGN PATENT DOCUMENTS

CN        101409281 A    4/2009
EP          2278345 A2    1/2011
(Continued)

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Cancun, Mexico, pp. 72-74, Jul. 1997.
(Continued)

*Primary Examiner* — Kyle J Moody
*Assistant Examiner* — Kevin H Sprenger
(74) *Attorney, Agent, or Firm* — Fletcher Yoder PC

(57) ABSTRACT

An integrated current replicator includes a first current sense resistor configured to sense a first input current to a power converter during a primary portion of a duty cycle and a first transconductance amplifier configured produce a first voltage at a common circuit node proportional to the first input current during the primary portion of the duty cycle. The integrated current replicator includes a second current sense resistor configured to sense a second input current to the power converter during a complementary portion of the duty cycle and a second transconductance amplifier configured produce a second voltage at the common circuit node proportional to the second input current during the complementary portion of the duty cycle. The integrated current replicator includes an amplifier configured to produce a voltage replicating the first input current and the second input current from the first voltage and the second voltage.

20 Claims, 6 Drawing Sheets

(58) Field of Classification Search
CPC ........... H02M 3/33507; H02M 3/1563; H02M 2001/0032; H02M 2001/0012; H02M 2001/0009
USPC ........................................ 323/282–286, 299
See application file for complete search history.

(56) References Cited

U.S. PATENT DOCUMENTS

| | | | |
|---|---|---|---|
| 4,918,026 A | 4/1990 | Kosiak et al. | |
| 4,922,327 A | 5/1990 | Mena et al. | |
| 4,947,192 A | 8/1990 | Hawkins et al. | |
| 4,982,353 A | 1/1991 | Jacob et al. | |
| 5,014,098 A | 5/1991 | Schlais et al. | |
| 5,029,283 A | 7/1991 | Ellsworth et al. | |
| 5,047,358 A | 9/1991 | Kosiak et al. | |
| 5,156,989 A | 10/1992 | Williams et al. | |
| 5,169,794 A | 12/1992 | Iranmanesh | |
| 5,264,782 A | 11/1993 | Newton | |
| 5,285,369 A | 2/1994 | Balakrishnan | |
| 5,321,319 A | 6/1994 | Mahmood | |
| 5,366,916 A | 11/1994 | Summe et al. | |
| 5,405,791 A | 4/1995 | Ahmad et al. | |
| 5,407,844 A | 4/1995 | Smayling et al. | |
| 5,469,334 A | 11/1995 | Balakrishnan | |
| 5,485,027 A | 1/1996 | Williams et al. | |
| 5,504,450 A | 4/1996 | McPartland | |
| 5,594,324 A | 1/1997 | Canter et al. | |
| 5,610,421 A | 3/1997 | Coneiero et al. | |
| 5,644,266 A | 7/1997 | Chen et al. | |
| 5,668,024 A | 9/1997 | Tsai | |
| 5,689,213 A | 11/1997 | Sher | |
| 5,710,054 A | 1/1998 | Gardner et al. | |
| 5,757,045 A | 5/1998 | Tsai et al. | |
| 5,833,585 A | 11/1998 | Jones et al. | |
| 5,859,606 A | 1/1999 | Schrader et al. | |
| 5,877,611 A | 3/1999 | Brkovic | |
| 5,888,861 A | 3/1999 | Chien et al. | |
| 5,889,315 A | 3/1999 | Farrenkopf et al. | |
| 5,899,732 A | 5/1999 | Gardner et al. | |
| 5,930,642 A | 7/1999 | Moore et al. | |
| 5,982,645 A | 11/1999 | Levran et al. | |
| 6,005,377 A | 12/1999 | Chen et al. | |
| 6,022,778 A | 2/2000 | Contiero et al. | |
| 6,118,351 A | 9/2000 | Kossives et al. | |
| 6,166,989 A | 12/2000 | Hamamoto et al. | |
| 6,204,542 B1 | 3/2001 | Kinoshita et al. | |
| 6,255,714 B1 | 7/2001 | Kossives | |
| 6,262,564 B1 | 7/2001 | Kanamori | |
| 6,271,063 B1 | 8/2001 | Chan et al. | |
| 6,285,539 B1 | 9/2001 | Kashimoto et al. | |
| 6,288,424 B1 | 9/2001 | Ludikhuize | |
| 6,297,108 B1 | 10/2001 | Chu | |
| 6,320,449 B1 | 11/2001 | Capici et al. | |
| 6,333,217 B1 | 12/2001 | Umimoto et al. | |
| 6,365,475 B1 | 4/2002 | Cheng et al. | |
| 6,380,004 B2 | 4/2002 | Boden, Jr. et al. | |
| 6,384,447 B2 | 5/2002 | Mihnea et al. | |
| 6,384,643 B1 | 5/2002 | Grose et al. | |
| 6,388,468 B1 | 5/2002 | Li | |
| 6,392,275 B1 | 5/2002 | Jang | |
| 6,407,579 B1 | 6/2002 | Goswick | |
| 6,413,806 B1 | 7/2002 | Sicard et al. | |
| 6,420,771 B2 | 7/2002 | Gregory | |
| 6,477,065 B2 | 11/2002 | Parks | |
| 6,495,019 B1 | 12/2002 | Filas et al. | |
| 6,521,960 B2 | 2/2003 | Lee | |
| 6,541,819 B2 | 4/2003 | Lotfi et al. | |
| 6,545,360 B1 | 4/2003 | Ohkubo et al. | |
| 6,550,666 B2 | 4/2003 | Chew et al. | |
| 6,573,694 B2 | 6/2003 | Pulkin et al. | |
| 6,650,169 B2 | 11/2003 | Faye et al. | |
| 6,653,174 B1 | 11/2003 | Cho et al. | |
| 6,688,985 B2 | 2/2004 | Weiss et al. | |
| 6,730,962 B2 | 5/2004 | Wu | |
| 6,744,676 B2 | 6/2004 | Leung et al. | |
| 6,765,272 B2 | 7/2004 | Natsume | |
| 6,791,305 B2 | 9/2004 | Imai et al. | |
| 6,822,882 B1 | 11/2004 | Jacobs et al. | |
| 6,833,585 B2 | 12/2004 | Kim et al. | |
| 6,855,985 B2 | 2/2005 | Williams et al. | |
| 6,873,017 B2 | 3/2005 | Cai et al. | |
| 6,879,137 B2 | 4/2005 | Sase | |
| 6,900,101 B2 | 5/2005 | Lin | |
| 6,911,694 B2 | 6/2005 | Negoro et al. | |
| 6,960,512 B2 | 11/2005 | Chang et al. | |
| 6,998,674 B2 | 2/2006 | Osada et al. | |
| 7,012,792 B2 | 3/2006 | Yoshida | |
| 7,015,544 B2 | 3/2006 | Lotfi et al. | |
| 7,019,505 B2 | 3/2006 | Dwarakanath et al. | |
| 7,038,438 B2 | 5/2006 | Dwarakanath et al. | |
| 7,071,044 B1 | 7/2006 | Krishnan et al. | |
| 7,074,684 B2 | 10/2006 | Roy et al. | |
| 7,129,143 B2 | 10/2006 | Park | |
| 7,186,606 B2 | 3/2007 | Lotfi et al. | |
| 7,190,026 B2 | 3/2007 | Lotfi et al. | |
| 7,195,981 B2 | 3/2007 | Lotfi et al. | |
| 7,211,516 B2 | 5/2007 | Lotfi et al. | |
| 7,214,985 B2 | 5/2007 | Lotfi et al. | |
| 7,229,886 B2 | 6/2007 | Lotfi et al. | |
| 7,230,302 B2 | 6/2007 | Lotfi et al. | |
| 7,230,316 B2 | 6/2007 | Yamazaki et al. | |
| 7,232,733 B2 | 6/2007 | Lotfi et al. | |
| 7,232,762 B2 | 6/2007 | Chang et al. | |
| 7,244,994 B2 | 7/2007 | Lotfi et al. | |
| 7,256,674 B2 | 8/2007 | Lotfi et al. | |
| 7,262,476 B2 | 8/2007 | Bude et al. | |
| 7,276,998 B2 | 10/2007 | Lotfi et al. | |
| 7,330,017 B2 | 2/2008 | Dwarakanath et al. | |
| 7,335,948 B2 | 2/2008 | Lotfi et al. | |
| 7,344,985 B2 | 3/2008 | Chen et al. | |
| 7,355,217 B1 | 4/2008 | Brand | |
| 7,355,255 B2 | 4/2008 | Chen et al. | |
| 7,365,402 B2 | 4/2008 | Ma | |
| 7,391,080 B2 | 6/2008 | Arnborg et al. | |
| 7,408,211 B2 | 8/2008 | Kao | |
| 7,420,247 B2 | 9/2008 | Xu et al. | |
| 7,422,967 B2 | 9/2008 | DeLoach et al. | |
| 7,422,968 B2 | 9/2008 | Lu et al. | |
| 7,426,780 B2 | 9/2008 | Lotfi et al. | |
| 7,462,317 B2 | 12/2008 | Lotfi et al. | |
| 7,489,007 B2 | 2/2009 | Williams et al. | |
| 7,511,350 B2 | 3/2009 | Chen et al. | |
| 7,544,558 B2 | 6/2009 | Ren et al. | |
| 7,544,995 B2 | 6/2009 | Lotfi et al. | |
| 7,598,606 B2 | 10/2009 | Williams et al. | |
| 7,605,428 B2 | 10/2009 | Williams et al. | |
| 7,626,233 B2 | 12/2009 | Tornblad et al. | |
| 7,679,342 B2 | 3/2010 | Lopata et al. | |
| 7,683,426 B2 | 3/2010 | Williams et al. | |
| 7,683,453 B2 | 3/2010 | Willliams et al. | |
| 7,710,094 B1 * | 5/2010 | Wong ................... H02M 3/156 323/225 |
| 7,719,054 B2 | 5/2010 | Williams et al. | |
| 7,759,184 B2 | 6/2010 | Lotfi et al. | |
| 7,812,393 B2 | 10/2010 | Williams | |
| 7,876,080 B2 | 1/2011 | Dwarankanath et al. | |
| 7,892,931 B2 | 2/2011 | Sridhar et al. | |
| 7,952,459 B2 | 5/2011 | Lotfi et al. | |
| 7,964,484 B2 | 6/2011 | Osada et al. | |
| 8,101,479 B2 | 1/2012 | Parker | |
| 8,212,315 B2 | 7/2012 | Lotfi et al. | |
| 8,212,316 B2 | 7/2012 | Lotfi et al. | |
| 8,212,317 B2 | 7/2012 | Lotfi et al. | |
| 8,253,195 B2 | 8/2012 | Lotti et al. | |
| 8,253,196 B2 | 8/2012 | Lotfi et al. | |
| 8,253,197 B2 | 8/2012 | Lotfi et al. | |
| 8,258,575 B2 | 9/2012 | Williams et al. | |
| 8,520,402 B1 | 8/2013 | Sivasubramaniam | |
| 8,618,580 B2 | 12/2013 | Lin et al. | |
| 8,633,540 B2 | 1/2014 | Lotfi et al. | |
| 8,716,790 B2 | 5/2014 | Lotfi et al. | |
| 8,987,815 B2 | 3/2015 | Lotfi et al. | |
| 2002/0164844 A1 | 11/2002 | Cai et al. | |
| 2002/0175366 A1 | 11/2002 | Lotfi et al. | |

(56) References Cited

U.S. PATENT DOCUMENTS

| | | |
|---|---|---|
| 2002/0185681 A1 | 12/2002 | Nakano et al. |
| 2003/0109112 A1 | 6/2003 | Wu |
| 2003/0147226 A1 | 8/2003 | Nakamura et al. |
| 2004/0094806 A1 | 5/2004 | Shillaci et al. |
| 2004/0121547 A1 | 6/2004 | Lee et al. |
| 2004/0227190 A1 | 11/2004 | Cai et al. |
| 2005/0110080 A1 | 5/2005 | Amborg et al. |
| 2005/0112822 A1 | 5/2005 | Litwin |
| 2005/0167756 A1 | 8/2005 | Lotfi et al. |
| 2005/0168203 A1 | 8/2005 | Dwarakanath et al. |
| 2005/0168205 A1 | 8/2005 | Dwarakanath et al. |
| 2005/0169024 A1 | 8/2005 | Dwarakanath et al. |
| 2005/0179084 A1 | 8/2005 | Robb et al. |
| 2005/0179472 A1 | 8/2005 | Nakamura et al. |
| 2005/0194639 A1 | 9/2005 | Negoro et al. |
| 2006/0027864 A1 | 2/2006 | Negoro et al. |
| 2006/0038225 A1 | 2/2006 | Lotfi et al. |
| 2006/0038237 A1 | 2/2006 | Lotfi et al. |
| 2006/0038238 A1 | 2/2006 | Lotfi et al. |
| 2006/0039224 A1 | 2/2006 | Lotfi et al. |
| 2006/0040441 A1 | 2/2006 | Lotfi et al. |
| 2006/0040449 A1 | 2/2006 | Lotfi et al. |
| 2006/0040451 A1 | 2/2006 | Lotfi et al. |
| 2006/0040452 A1 | 2/2006 | Lotfi et al. |
| 2006/0081937 A1 | 4/2006 | Lotfi et al. |
| 2006/0145250 A1 | 7/2006 | Ma |
| 2006/0278931 A1 | 12/2006 | Lee et al. |
| 2007/0224752 A1 | 9/2007 | Lotfi et al. |
| 2007/0284658 A1 | 12/2007 | Lotfi et al. |
| 2008/0001233 A1 | 1/2008 | Kapoor et al. |
| 2008/0061368 A1 | 3/2008 | Williams et al. |
| 2008/0061400 A1 | 3/2008 | Williams et al. |
| 2008/0067585 A1 | 3/2008 | Williams et al. |
| 2008/0067586 A1 | 3/2008 | Williams et al. |
| 2008/0067588 A1 | 3/2008 | Williams et al. |
| 2008/0080111 A1 | 4/2008 | Lin et al. |
| 2008/0142899 A1 | 6/2008 | Morris et al. |
| 2008/0153221 A1 | 6/2008 | Sridhar et al. |
| 2008/0157226 A1 | 7/2008 | Majcherczak et al. |
| 2008/0199999 A1 | 8/2008 | Weijtmans et al. |
| 2008/0242032 A1 | 10/2008 | Chakravarthi et al. |
| 2008/0301929 A1 | 12/2008 | Lotfi et al. |
| 2009/0065964 A1 | 3/2009 | Lotfi et al. |
| 2009/0096435 A1 | 4/2009 | Ueunten |
| 2009/0096511 A1 | 4/2009 | Ueunten |
| 2009/0167267 A1 | 7/2009 | Dwarakanath et al. |
| 2009/0212751 A1 | 8/2009 | Cervera et al. |
| 2009/0261791 A1 | 10/2009 | Lopata et al. |
| 2009/0269899 A1 | 10/2009 | Osada et al. |
| 2009/0296310 A1 | 12/2009 | Chikara |
| 2009/0315527 A1* | 12/2009 | Kung ............... H02M 3/158 323/282 |
| 2010/0039836 A1* | 2/2010 | Gong ............... H02M 3/156 363/21.13 |
| 2010/0044789 A1 | 2/2010 | Lotfi et al. |
| 2010/0052050 A1 | 3/2010 | Lotfi et al. |
| 2010/0052051 A1 | 3/2010 | Lotfi et al. |
| 2010/0052052 A1 | 3/2010 | Lotfi et al. |
| 2010/0156374 A1 | 6/2010 | Lopata et al. |
| 2010/0164449 A1 | 7/2010 | Dwarakanath et al. |
| 2010/0164650 A1 | 7/2010 | Abou-Alfotouh et al. |
| 2010/0244106 A1 | 9/2010 | Parker et al. |
| 2010/0244152 A1 | 9/2010 | Bahl |
| 2010/0301496 A1 | 12/2010 | Koduri |
| 2011/0006763 A1 | 1/2011 | Bakker |
| 2011/0018515 A1* | 1/2011 | McCloy-Stevens ............... H02M 3/1588 323/284 |
| 2011/0031947 A1 | 2/2011 | You |
| 2011/0049621 A1 | 3/2011 | Lotfi et al. |
| 2011/0074498 A1 | 3/2011 | Thompson et al. |
| 2011/0095742 A1 | 4/2011 | Lopata et al. |
| 2011/0101933 A1 | 5/2011 | Lopata et al. |
| 2011/0101934 A1 | 5/2011 | Lopata et al. |
| 2011/0101948 A1 | 5/2011 | Lopata et al. |
| 2011/0101949 A1 | 5/2011 | Lopata et al. |
| 2011/0215414 A1 | 9/2011 | Osada et al. |
| 2011/0221000 A1 | 9/2011 | Shima |
| 2011/0316053 A1 | 12/2011 | Brand |
| 2012/0074922 A1* | 3/2012 | Suzuki ............... H02M 3/155 323/312 |
| 2012/0182003 A1* | 7/2012 | Flaibani ............... H02M 3/156 323/284 |
| 2013/0151825 A1* | 6/2013 | Huynh ............... H02M 1/08 713/1 |

FOREIGN PATENT DOCUMENTS

| | | |
|---|---|---|
| TW | 200816374 A | 4/2008 |
| TW | 200847330 A | 12/2008 |
| TW | 201120459 A | 6/2011 |
| TW | 201225298 A | 6/2012 |

OTHER PUBLICATIONS

Goodman, J. et al., "An Energy/Security Scalable Encryp-tion Processor Using an Embedded Variable Voltage DC/DC Converter," IEEE Journal of Solid-State Circuits, vol. 33, No. 11 (Nov. 1998), pp. 1799-1809.

Horowitz, P., et al., "The Art of Electronics," Second Edi-tion, 1989, pp. 288-291, Cambridge University Press, Cambridge, MA, 6 pgs.

Lotfi, A.W., et al., "Issues and Advances in High-Frequency Mag-netics for Switching Power Supplies," Proceedings of the IEEE, Jun. 2001, vol. 89, No. 6, pp. 833-845.

Ludikhuize, A.W., "A Review of Resurf Technology," Proceedings of IEEE ISPSD 2000, May 22, 2000, pp. 11-18.

* cited by examiner

INTEGRATED CURRENT REPLICATOR AND METHOD OF OPERATING THE SAME

TECHNICAL FIELD

The present invention is directed, in general, to electronic devices and, in particular, to an integrated current replicator for a power converter and method of operating the same.

BACKGROUND

A current in a power converter or other electronic devices is often an important operating characteristic that often should be replicated or sensed with a signal, generally with minimal delay (i.e., with wide bandwidth). A signal that replicates a current provides an indicator that the power converter or other electronic device is operating at or near maximum performance. The signal can also be employed to prevent component damage when an over-current event or a short circuit is encountered.

Conventional arrangements to provide a signal that replicates a current generally operate in a single quadrant (i.e., a current is sensed in only one direction and with a positive voltage). Sensing a current in power converters such as dc-dc power converters is usually performed in a two-quadrant mode (i.e., a signal is produced that senses a bidirectional current and with a positive voltage). If two-quadrant sensing is necessary, a conventional arrangement duplicates the circuit that provides the current-replicating signal, thereby increasing the cost, component count and circuit area.

Producing a signal that replicates a current is often done using a current sense resistor external to a high-gain operational amplifier. Separation of the current sense resistor from the operational amplifier leads to inaccuracy and temperature-dependent results due to mismatching of component characteristics. Some integrated current-sensing solutions employ a scaled version of power switches coupled in parallel with the power switches to sense current therein. This approach can be accurate, but involves complex and often duplicated circuitry, and is still sensitive to component mismatching and manufacturing process variations.

There is often a need to sense a current in a power converter that is divided between two circuit components such as two alternately-conducting power switches employed in a buck power converter topology. The current sensing should be performed at each of the two circuit components rather than in the circuit before or after division of the circuit between the two circuit components. There is a further challenge to sense divided currents when there is a substantial dc bias between the two circuit components.

Thus, there is an unanswered need to provide a circuit structure and method to provide a signal that accurately replicates a current that is conducted by two circuit components in a power converter or other electronic device, which can be a bidirectional current. The resulting circuit structure should be substantially insensitive to an operating temperature and manufacturing variations. Accordingly, what is needed in the art is a circuit structure and method of forming and operating the same that overcomes the deficiencies of current designs.

SUMMARY OF THE INVENTION

These and other problems are generally solved or circumvented, and technical advantages are generally achieved, by advantageous embodiments of the present invention, which include an integrated current replicator for a power converter and method of operating the same. In one embodiment, the integrated current replicator includes a first current sense resistor configured to sense a first input current to the power converter during a primary portion of a duty cycle thereof and a first transconductance amplifier, coupled to the first current sense resistor, configured produce a first voltage at a common circuit node of the integrated current replicator proportional to the first input current during the primary portion of the duty cycle. The integrated current replicator also includes a second current sense resistor configured to sense a second input current to the power converter during a complementary portion of the duty cycle thereof and a second transconductance amplifier, coupled to the second current sense resistor, configured produce a second voltage at the common circuit node proportional to the second input current during the complementary portion of the duty cycle. The integrated current replicator also includes an amplifier, coupled to the common node, configured to produce a voltage replicating the first input current and the second input current from the first voltage and the second voltage, respectively.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale

DETAILED DESCRIPTION OF ILLUSTRATIVE EMBODIMENTS

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described in a specific context, namely, an integrated current replicator for a power converter including transconductance amplifiers and methods of operating and forming the same. While the principles of the present invention will be described in the environment of a power converter employing alternately conducting power switches, any application or related electronic devices that may benefit from an integrated current replicator that can enable temperature-independent replication of a current is well within the broad scope of the present invention.

Figure 1:
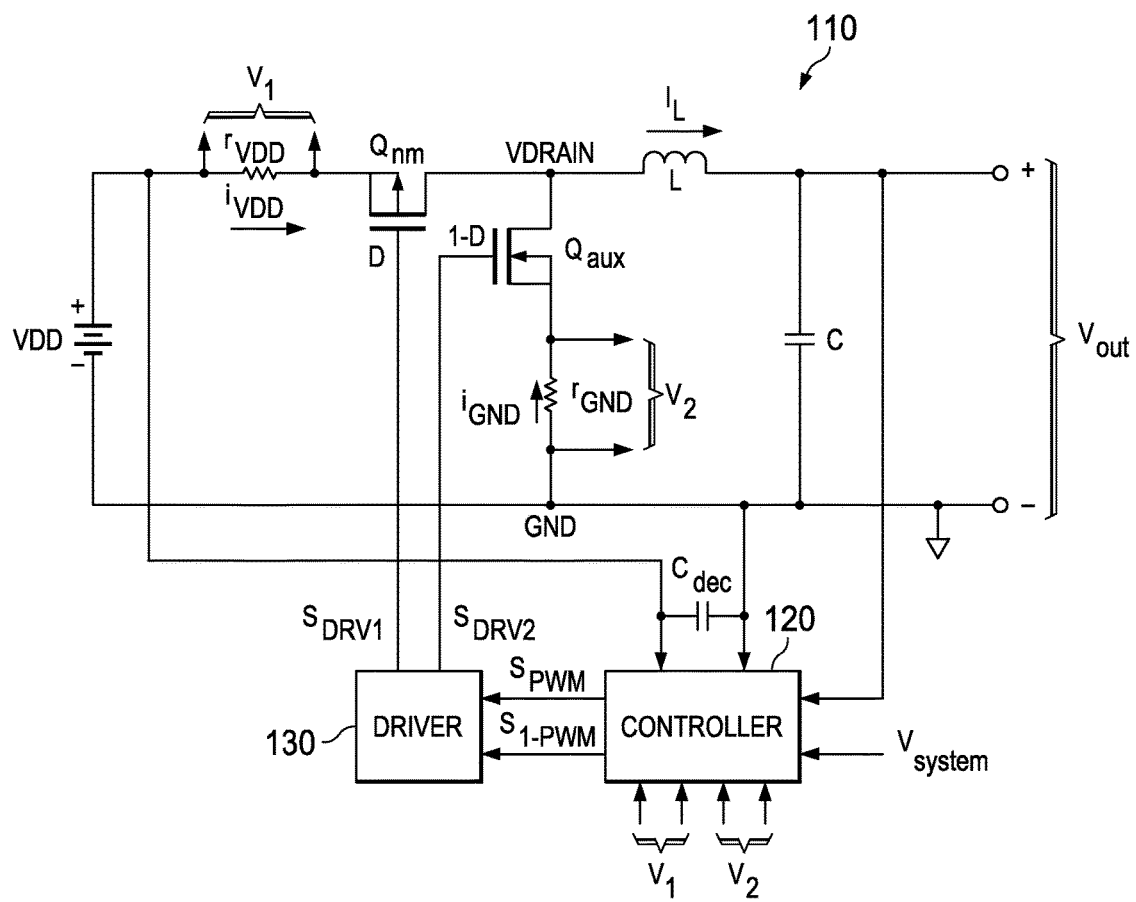
FIG. 1 illustrates a schematic diagram of an embodiment of a power converter including power conversion circuitry.

Referring initially to FIG. 1, illustrated is a schematic diagram of an embodiment of a power converter including power conversion circuitry formed with main and auxiliary power switches $Q_{mn}$, $Q_{aux}$. The power converter includes a power train 110, a controller 120 and a driver 130 including control circuit elements, and provides power to a system/load such as a microprocessor. While in the illustrated embodiment, the power train 110 employs a buck converter topology, those skilled in the art should understand that other converter topologies such as a forward converter topology are well within the broad scope of the present invention.

The power train 110 receives an input voltage VDD from a source of electrical power (represented by a battery) at an input thereof and provides a regulated output voltage $V_{out}$ to power, for instance, a microprocessor coupled to an output thereof. In keeping with the principles of a buck converter topology, the output voltage $V_{out}$ is generally less than the input voltage VDD such that a switching operation of the power converter can regulate the output voltage $V_{out}$. An active element such as a semiconductor switch (e.g., a main power semiconductor switch or main power switch $Q_{mn}$) is enabled to conduct for a primary portion (or interval) of a duty cycle associated with the power converter (generally co-existent with a primary duty cycle "D" of the main power switch $Q_{mn}$) and couples the input voltage VDD to an output filter inductor L. During the primary interval, an inductor current $I_L$ flowing through the output filter inductor L increases as a first input current $i_{VDD}$ flows from the input through a first current sense resistor $r_{VDD}$ to the output of the power train 110. The first input current $i_{VDD}$ that flows from the input through the first current sense resistor $r_{VDD}$ during the primary interval produces a first current-sense voltage $V_1$. A portion of the inductor current $I_L$ is filtered by an output filter capacitor C.

During a complementary portion (or interval) of a duty cycle associated with the power converter (generally co-existent with a complementary duty cycle "1-D" of the main power switch $Q_{mn}$), the main power switch $Q_{mn}$ is transitioned to a non-conducting state and another active element such as another semiconductor switch (e.g., an auxiliary power semiconductor switch or auxiliary power switch $Q_{aux}$) is enabled to conduct. The auxiliary power switch $Q_{aux}$ provides a path to maintain a continuity of the inductor current $I_L$ flowing through the output filter inductor L. During the complementary interval, the inductor current $I_L$ flows through a second current sense resistor $r_{GND}$ as a second input current $i_{GND}$, and the inductor current $I_L$ that flows through the output filter inductor L decreases. The second input current $i_{GND}$ that flows from local circuit ground through the second current sense resistor $r_{GND}$ during the complementary interval produces a second current-sense voltage $V_2$. In general, the respective duty cycle of the main and auxiliary power switches $Q_{mn}$, $Q_{aux}$ may be adjusted to maintain a regulation of the output voltage $V_{out}$ of the power converter. Those skilled in the art should understand, however, that the conduction periods for the main and auxiliary power switches $Q_{mn}$, $Q_{aux}$ may be separated by a small time interval to avoid cross conduction therebetween and beneficially to reduce the switching losses associated with the power converter. A drain terminal VDRAIN (also referred to as a "switched terminal" and a "common node") with respect to the main and auxiliary power switches $Q_{mn}$, $Q_{aux}$ and a ground terminal GND of the power converter are also designated in FIG. 1.

The controller 120 receives a desired characteristic such as a desired system voltage $V_{system}$ from an internal or external source associated with the microprocessor, and the output voltage $V_{out}$ of the power converter. The controller 120 is also coupled to the input voltage VDD of the power converter and a return lead of the source of electrical power (again, represented by a battery) to provide a ground connection therefor. A decoupling capacitor $C_{dec}$ is coupled to the path from the input voltage VDD to the controller 120. The decoupling capacitor $C_{dec}$ is configured to absorb high frequency noise signals associated with the source of electrical power to protect the controller 120. In an embodiment, the first and second current sense resistors $r_{VDD}$, $r_{GND}$ are formed as circuit elements of an integrated current replicator as described below. The integrated current replicator in turn is an element of the controller 120.

In accordance with the aforementioned characteristics, the controller 120 provides a signal (e.g., a pulse width modulated ("PWM") signal $S_{PWM}$) to control the duty cycle and a frequency of the main and auxiliary power switches $Q_{mn}$, $Q_{aux}$ of the power train 110 to regulate the output voltage $V_{out}$ thereof. The controller 120 may also provide a complement of the signal (e.g., a complementary pulse width modulated signal $S_{1-PWM}$) in accordance with the aforementioned characteristics. Any controller adapted to control at least one semiconductor switch of the power converter is well within the broad scope of the present invention. As an example, a controller employing digital circuitry is disclosed in U.S. Pat. No. 7,038,438, entitled "Controller for a Power Converter and a Method of Controlling a Switch Thereof," to Dwarakanath, et al. and U.S. Pat. No. 7,019,505, entitled "Digital Controller for a Power Converter Employing Selectable Phases of a Clock Signal," to Dwarakanath, et al., which are incorporated herein by reference.

The power converter also includes the driver 130 configured to provide drive signals (e.g., gate drive signals) $S_{DRV1}$, $S_{DRV2}$ to the main and auxiliary power switches $Q_{mn}$, $Q_{aux}$, respectively, based on the PWM and complementary PWM signals $S_{PWM}$, $S_{1-PWM}$ provided by the controller 120. There are a number of viable alternatives to implement a driver 130 that include techniques to provide sufficient signal delays to prevent crosscurrents when controlling multiple power semiconductor switches in the power converter. The driver 130 typically includes active elements such as switching circuitry incorporating a plurality of driver switches that cooperate to provide the drive signals $S_{DRV1}$, $S_{DRV2}$ to the main and auxiliary power switches $Q_{mn}$, $Q_{aux}$. Of course, any driver 130 capable of providing the drive signals $S_{DRV1}$, $S_{DRV2}$ to control a semiconductor switch is well within the broad scope of the present invention. As an example, a driver is disclosed in U.S. Pat. No. 7,330,017, entitled "Driver for a Power Converter and Method of Driving a Switch Thereof," to Dwarakanath, et al., which is incorporated herein by reference. Also, an embodiment of a semiconductor device that may embody portions of the power conversion circuitry is disclosed in U.S. Pat. No. 7,230,302, entitled "Laterally Diffused Metal Oxide Semiconductor Device and Method of Forming the Same," to Lotfi, et al., and U.S. patent application Ser. No. 14/091,739, entitled "Semiconductor Device including Alternating Source and Drain Regions, and Respective Source and Drain Metallic Strips," to Lotfi, et al., which are incorporated herein by reference, and an embodiment of an integrated circuit embodying power conversion circuitry, or portions thereof, is disclosed in U.S. Pat. No. 7,015,544, entitled "Integrated Circuit Employable with a Power Converter," to Lotfi, et al., which is incorporated by reference.

As introduced herein, a circuit structure and method are introduced to sum two currents in a power converter employing an integrated current replicator. The two currents are combined in a common circuit element, e.g., an output inductor L of the power converter. In an embodiment, each of the currents flows in a respective power switch (e.g., a metal-oxide semiconductor field-effect transistor "MOSFET") including current that may flow through a respective body diode thereof. The drains of the power switches are coupled together to enable the summed current to flow through the output inductor L. Current replication of the currents flowing through the power switches is provided with high accuracy and temperature independence for two-quadrant operation in power converters employing a single external resistor to provide a programmable gain. Current replication generally refers to producing a signal with a known proportionality to one or more currents.

Figure 2:
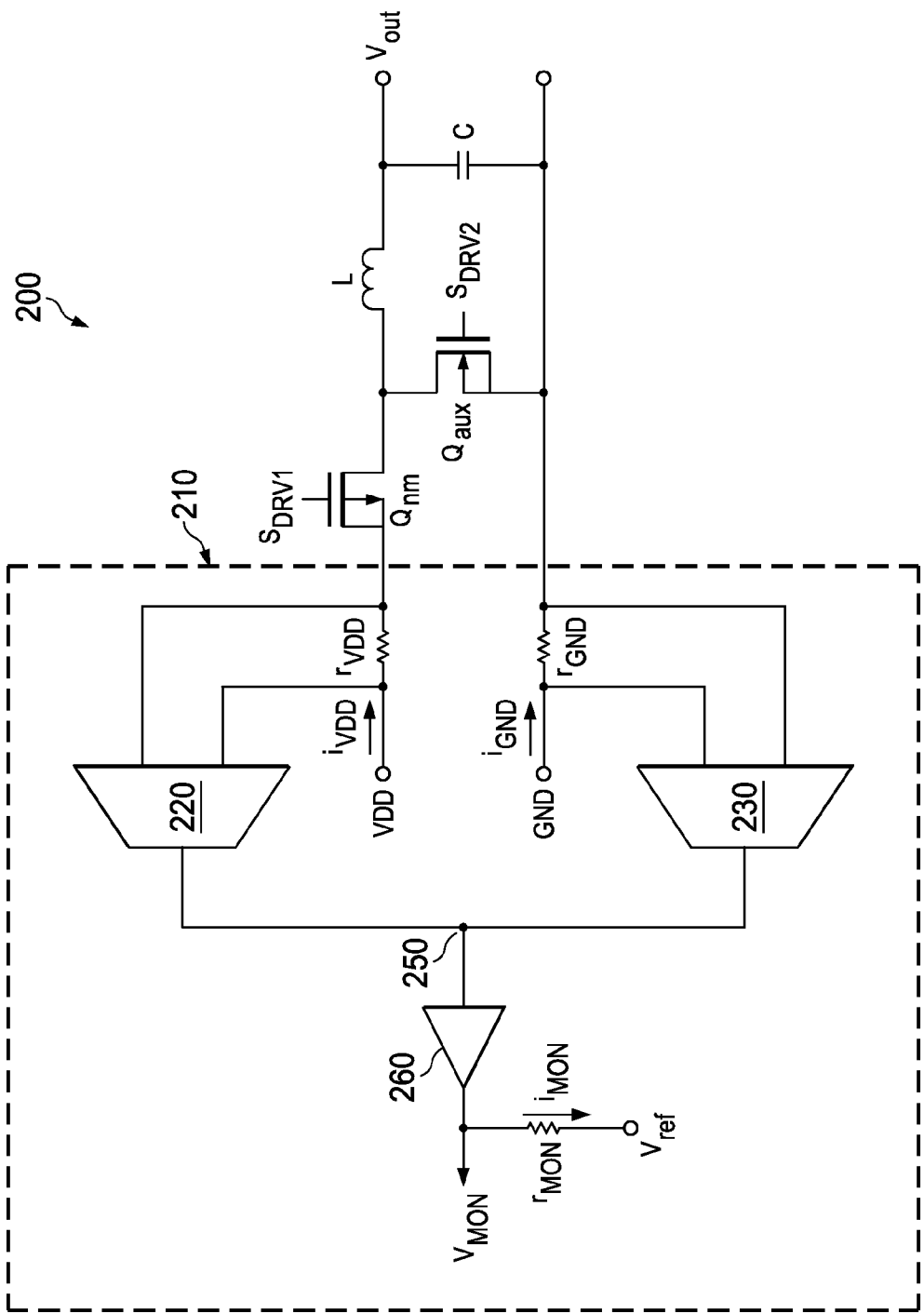
FIGS. 2 and 3 illustrate simplified schematic diagrams of embodiments of power converters formed with an integrated current replicator.

Turning now to FIG. 2, illustrated is a simplified schematic diagram of an embodiment of a power converter 200 formed with an integrated current replicator 210 coupled to main and auxiliary power switches $Q_{mn}$, $Q_{aux}$. The main and auxiliary power switches $Q_{mn}$, $Q_{aux}$, in turn, are coupled to an output filter formed with output filter inductor L and output filter capacitor C. The integrated current replicator 210 is formed with a first current sense resistor $r_{VDD}$ coupled to a first transconductance amplifier 220 and a second current sense resistor $r_{GND}$ coupled to a second transconductance amplifier 230 to replicate currents flowing through the main and auxiliary power switches $Q_{mn}$, $Q_{aux}$ with high accuracy, high bandwidth, and substantial temperature independence. The output of the first transconductance amplifier 220 and the output of the second transconductance amplifier 230 are coupled together at a common node 250 at an input to an amplifier 260. An output of amplifier 260 produces a current $i_{MON}$ through a current sense monitoring resistor $r_{MON}$ that in turn produces a voltage (a current replicator output voltage) $v_{MON}$ that replicates first and second input currents $i_{VDD}$, $i_{GND}$ that flow respectively through the first current sense resistor $r_{VDD}$ and the second current sense resistor $r_{GND}$.

Figure 3:
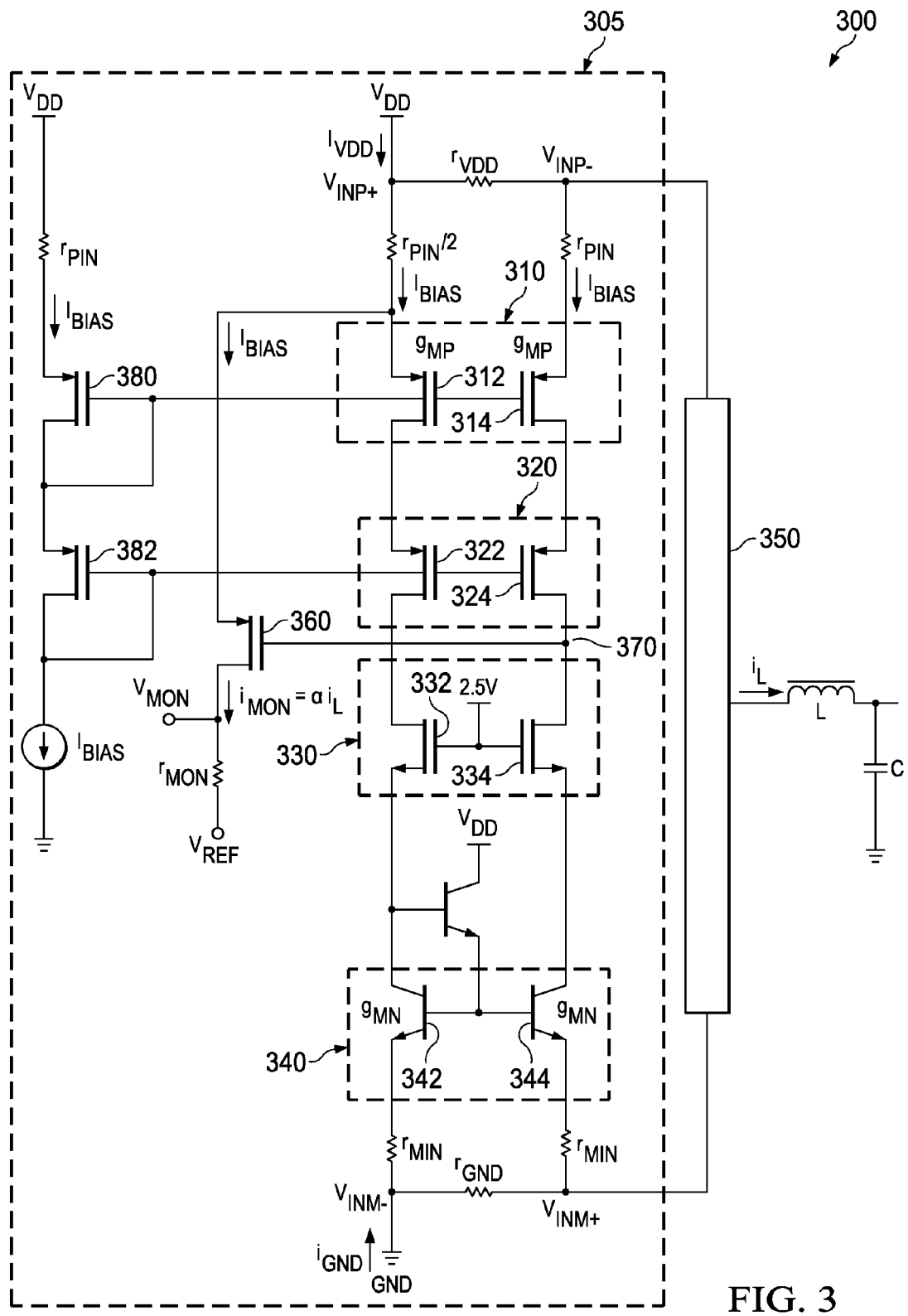

Turning now to FIG. 3, illustrated is a simplified schematic diagram of an embodiment of a power converter 300 formed with an integrated current replicator 305 coupled to power switches 350. The power switches 350 (e.g., the main and auxiliary power switches illustrated and described hereinabove with reference to FIG. 1) are coupled to an input voltage source VDD and to an output filter formed with an output filter inductor L and an output filter capacitor C to produce a dc output voltage $V_{out}$. The integrated current replicator 305 is configured to replicate a first input current $i_{VDD}$ that flows through the output filter inductor L from the input voltage source VDD during a primary portion (D) of a duty cycle of the power converter 300, and a second input current $i_{GND}$ that flows through the output filter inductor L from local circuit ground GND during a complementary portion (1-D) of the duty cycle. The integrated current replicator 305 produces a corresponding voltage $V_{MON}$ replicating the first input current $i_{VDD}$ and the second input current $i_{GND}$.

An inductor current $i_L$ is the sum of the first input current $i_{VDD}$ that flows from the input voltage source VDD during the primary portion of the duty cycle of the power converter 300, and the second input current $i_{GND}$ that flows from local circuit ground GND during the complementary portion of the duty cycle. During the primary portion of the duty cycle, a first transconductance amplifier 310 (a common-gate transconductance amplifier with transconductance gain $g_{MP}$) coupled in cascade with a first series amplifier 320 produces the voltage $v_{MON}$ at the output of amplifier 360 given by the equation:

$$v_{MON} = i_L \times r_{VDD}(r_{MON}/r_{PIN}),$$

where the parameters $r_{VDD}$, $r_{PIN}$, and $r_{MON}$ are the resistances of the respective resistors illustrated in FIG. 3. In a similar way, the second transconductance/common-base amplifier 340 (with transconductance gain $g_{MN}$) coupled in cascade with a second series amplifier 330 operates during the complementary portion of the duty cycle, and produces the voltage $v_{MON}$ at the output of amplifier 360 given by the equation:

$$v_{MON} = i_L \times r_{GND}(r_{MON}/r_{MIN}),$$

where the parameters $r_{GND}$, $r_{MIN}$ and $r_{MON}$ are the resistances of the respective resistors illustrated in FIG. 3. In order to have substantially identical gains between sensing/replicating the first input current $i_{VDD}$ and sensing/replicating the second input current $i_{GND}$, the following condition is satisfied:

$$r_{VDD}/r_{PIN} = r_{GND}/r_{MIN}.$$

The integrated current replicator 305 is substantially insensitive to temperature variations therein because the thermal coefficients of the first and second current sense resistors $r_{GND}$, $r_{VDD}$ and the gain resistor pairs (a first input resistor (or resistor pair) $r_{PIN}$, $r_{PIN}/2$ to the first transconductance amplifier 310 and a second input resistor (or resistor pair) $r_{MIN}$ to the second transconductance amplifier 340) are formed as metallic paths of the same or similar material and are located in the same integrated semiconductor device. As a result, overall changes in temperature cancel each other's proportional variation of resistance. A current sense monitoring resistor $r_{MON}$ is preferably selected as an external resistor with a substantially zero thermal coefficient of resistance so that the integrated current replicator 305 is substantially insensitive to temperature variations. The current sense monitoring resistor $r_{MON}$ is coupled to an internal or external reference voltage source $V_{ref}$ that can be a fixed voltage reference source. The integrated current replicator 305 is substantially insensitive to process variations because its gain is based on resistor ratios of similarly constructed circuit elements rather than absolute values. The gain of the integrated current replicator 305 can be adjusted by changing the current sense monitoring resistor $r_{MON}$, which, as noted, can be an external resistor. The integrated current replicator 305 operates in a two-quadrant mode because it is capable of replicating both positive and negative currents that flow through the first and second current sense resistors $r_{GND}$, $r_{VDD}$.

The integrated current replicator 305 is formed with a dual common-gate/base amplifier structure to reduce parasitic capacitances to provide a high amplifier bandwidth and low input voltage offset. The integrated current replicator 305 includes the first transconductance amplifier 310 configured as a common-gate transconductance amplifier and is coupled in cascade for higher voltage gain to the first series amplifier 320. The second transconductance amplifier 340 is configured as a common-base transconductance amplifier and is coupled in cascade for higher voltage gain to the second series amplifier 330. The first transconductance amplifier 310 is formed as an integrated circuit with matched p-channel metal-oxide semiconductor ("PMOS") transistors 312, 314, and the second transconductance amplifier 340 is formed with matched npn transistors 342, 344. It would be preferable to use matched pnp transistors for the matched PMOS transistors 312, 314 because bipolar transistors can generally be formed with better matching than paired MOS transistors. It is also generally recognized that it is more economical at the present time of technology development to obtain matched PMOS transistors than it is to obtain matched pnp transistors. Accordingly, in an embodiment, the first transconductance amplifier 310 is formed with the matched PMOS transistors 312, 314. The first series amplifier 320 is also formed with matched PMOS transistors 322, 324 and the second series amplifier 330 is formed with matched n-channel metal-oxide semiconductor ("NMOS") transistors 332, 334.

Control elements (i.e., gates and bases) of each of the first and second series amplifiers 320, 330 and the first and second transconductance amplifiers 310, 340 are coupled to respective local bias voltage sources, characteristic of which such as voltages can be set with current mirrors to set a current level through the first and second transconductance amplifiers 310, 340. The local gate-bias voltage sources that provide voltages for the gates/bases of the first and second transconductance amplifiers 310, 340 are arranged to provide appropriate bias voltage levels for the respective stage or transconductance amplifier. In particular, the MOSFETs 380, 382 are arranged in a current-mirror configuration with the respective first transconductance amplifier 310 and the first series amplifier 320 to provide a desired current level $I_{BIAS}$. The gates of the second series amplifier 330 are set to an example internal bias voltage level of 2.5 volts ("V").

The first transconductance amplifier 310 senses a voltage difference $V_{IN+}-V_{IN-}$ (the first current sense voltage $V_1$ illustrated in FIG. 1) formed by the first input current $i_{VDD}$ that flows through the first current sense resistor $r_{VDD}$, and the second transconductance amplifier 340 senses a voltage difference $V_{IN-}-V_{IN+-}$ (the second current sense voltage $V_2$ illustrated in FIG. 1) formed by the second input current $i_{GND}$ that flows through the second current sense resistor $r_{GND}$. In response thereto, the first transconductance amplifier 310 in cascade with the first series amplifier 320 produces a first voltage at a common node 370 and the second transconductance amplifier 340 in cascade with the second series amplifier 330 produces a second voltage at the common node 370. The source of the amplifier (e.g., a PMOS transistor) 360 is coupled to one input of the first transconductance amplifier 310, and the gate of the amplifier 360 is coupled to the common node 370 to provide negative feedback to produce a current $i_{MON}$ that is proportional to the inductor current $i_L$ that flows through the output filter inductor L with a desired proportionality constant α:

$$i_{MON} = \alpha \cdot i_L.$$

The current $i_{MON}$ flows through the amplifier 360. The result of this arrangement produces the current $i_{MON}$ that is proportional to the first input current $i_{VDD}$ that flows through the first current sense resistor $r_{VDD}$. Similarly, the current $i_{MON}$ is produced through the amplifier 360 that is also proportional to the second input current $i_{GND}$ that flows through the second current sense resistor $r_{GND}$. The current $i_{MON}$ produces the voltage (a current replicator output voltage) $V_{MON}$ through the current sense monitoring resistor $r_{MON}$ that is proportional to the respective first and second input currents $i_{VDD}$, $i_{GND}$ that flow through the first and second current sense resistors $r_{VDD}$, $r_{GND}$.

Figure 4:
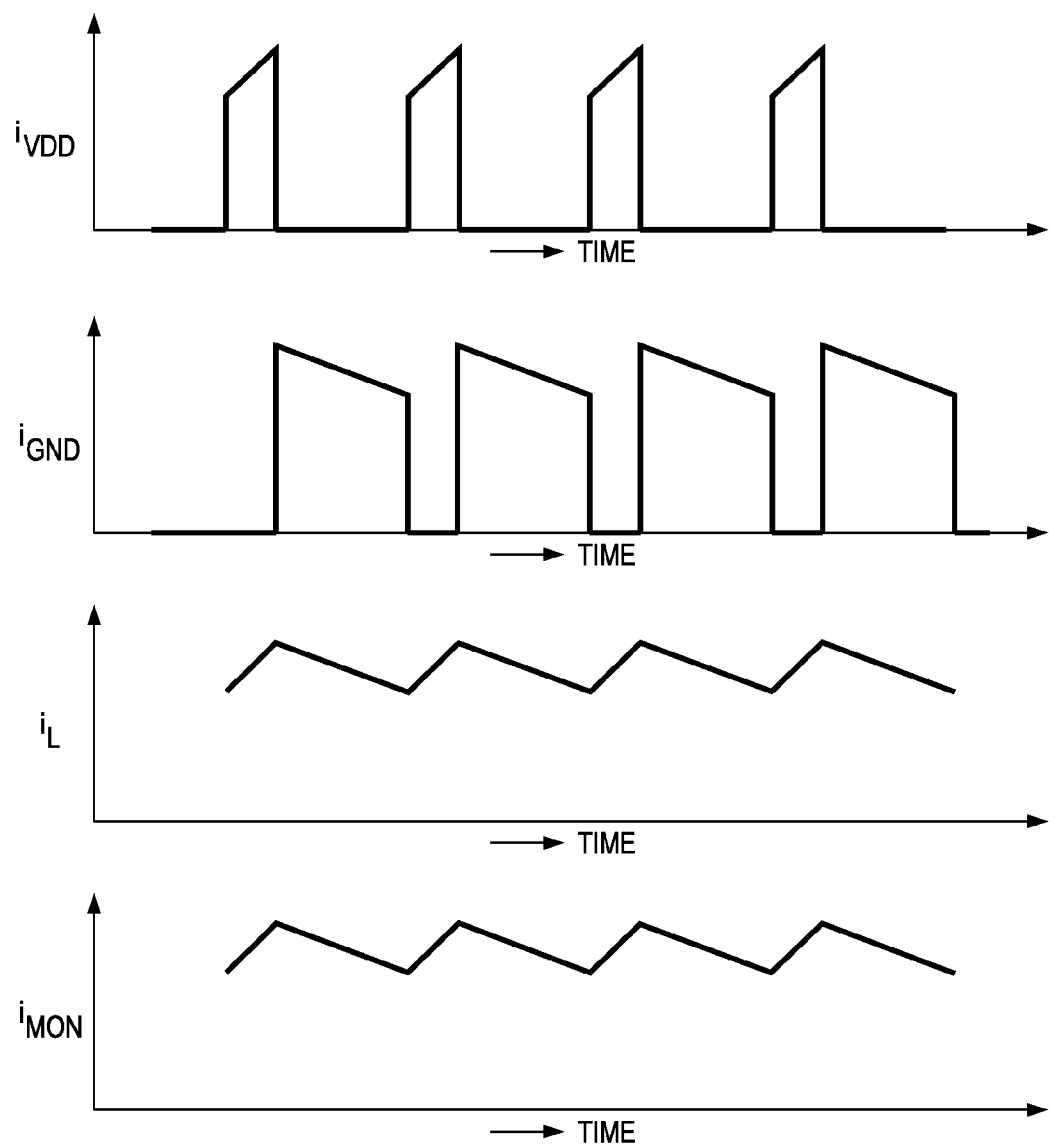
FIG. 4 illustrates current waveforms over time produced by the power converter of FIG. 3.

Turning now to FIG. 4, illustrated are current waveforms over time produced by the power converter 300 formed with the integrated current replicator 305 of FIG. 3. In the top waveform of FIG. 4, illustrated is the first input current $i_{VDD}$ that flows through the first current sense resistor $r_{VDD}$ during the primary portion of the duty cycle. In the next lower waveform of FIG. 4, illustrated is the second input current $i_{GND}$ that flows through the second current sense resistor $r_{GND}$ during the complementary portion of the duty cycle. The inductor current $i_L$ illustrated in the next lower waveform of FIG. 4 is the sum of the first and second input currents $i_{GND}$, $i_{VDD}$. In the bottom waveform of FIG. 4, illustrated is the current $i_{MON}$ that is proportional to the first and second input currents $i_{VDD}$, $i_{GND}$ that flow through the first and second current sense resistors $r_{VDD}$, $r_{GND}$. Thus, the integrated current replicator 305 produces a substantially temperature-independent current replicator output voltage $V_{MON}$ that is proportional to the inductor current $i_L$ that flows through the output filter inductor L with high bandwidth and small offsets by sensing the first and second input currents $i_{VDD}$, $i_{GND}$ that flow through the first and second current sense resistors $r_{VDD}$, $r_{GND}$, respectively. The current replicator output voltage $V_{MON}$ is also substantially insensitive to manufacturing process variations.

Figure 5:
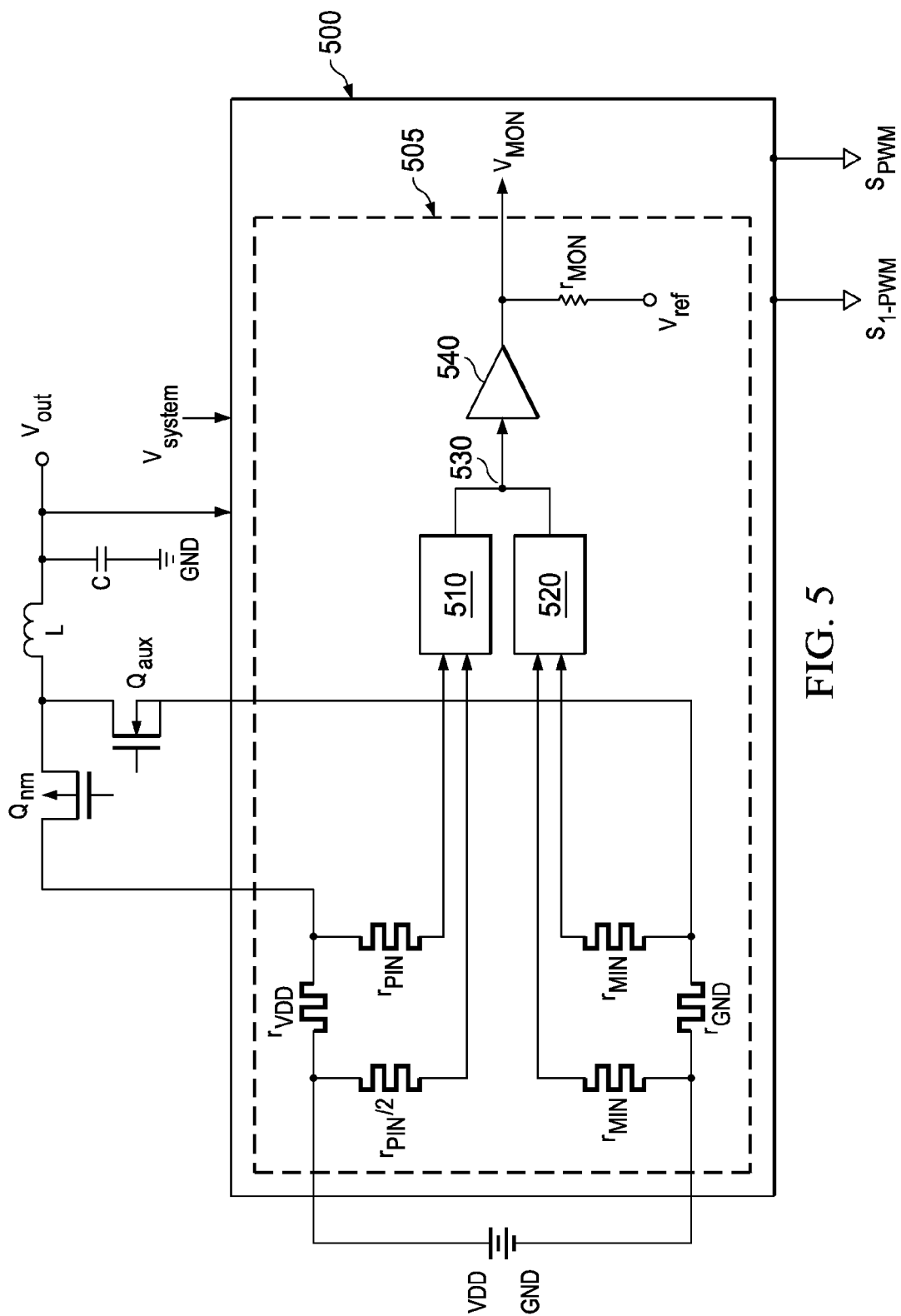
FIG. 5 illustrates a simplified schematic diagram of an embodiment of a power converter controlled by a controller that is formed with an integrated current replicator.

Turning now to FIG. 5, illustrated is a simplified schematic diagram of an embodiment of a power converter controlled by a controller 500 that is formed with an integrated current replicator 505 coupled to main and auxiliary power switches $Q_{mn}$, $Q_{aux}$. The controller 505 produces the PWM signals $S_{PWM}$, $S_{1-PWM}$ described previously hereinabove with reference to FIG. 1. The integrated current replicator 505 is formed with first and second transconductance amplifiers 510, 520, outputs of which are coupled together at the common node 530 that is coupled to the input of an amplifier 540. The output of amplifier 540 is coupled to a current sense monitoring resistor $r_{MON}$ to produce the current replicator output voltage $V_{MON}$.

The drawing shows an example structure of the first and second current sense resistors $r_{VDD}$, $r_{GND}$, the pair of first input resistors $r_{PIN}$ (to the first transconductance amplifier 510), and the pair of second input resistors $r_{MIN}$ (to the second transconductance amplifier 520). The aforementioned resistors may be formed as metallic paths of the same or similar material and are located in the same integrated semiconductor device. The first and second current sense resistors $r_{VDD}$, $r_{GND}$ are generally formed with substantially the same layout geometry, and the pair of first and second input resistors $r_{PIN}$, $r_{MIN}$, are also generally formed with the same or similar layout geometry. As a result, changes in temperature substantially proportionally cancel each other's variation of resistance.

Figure 6:
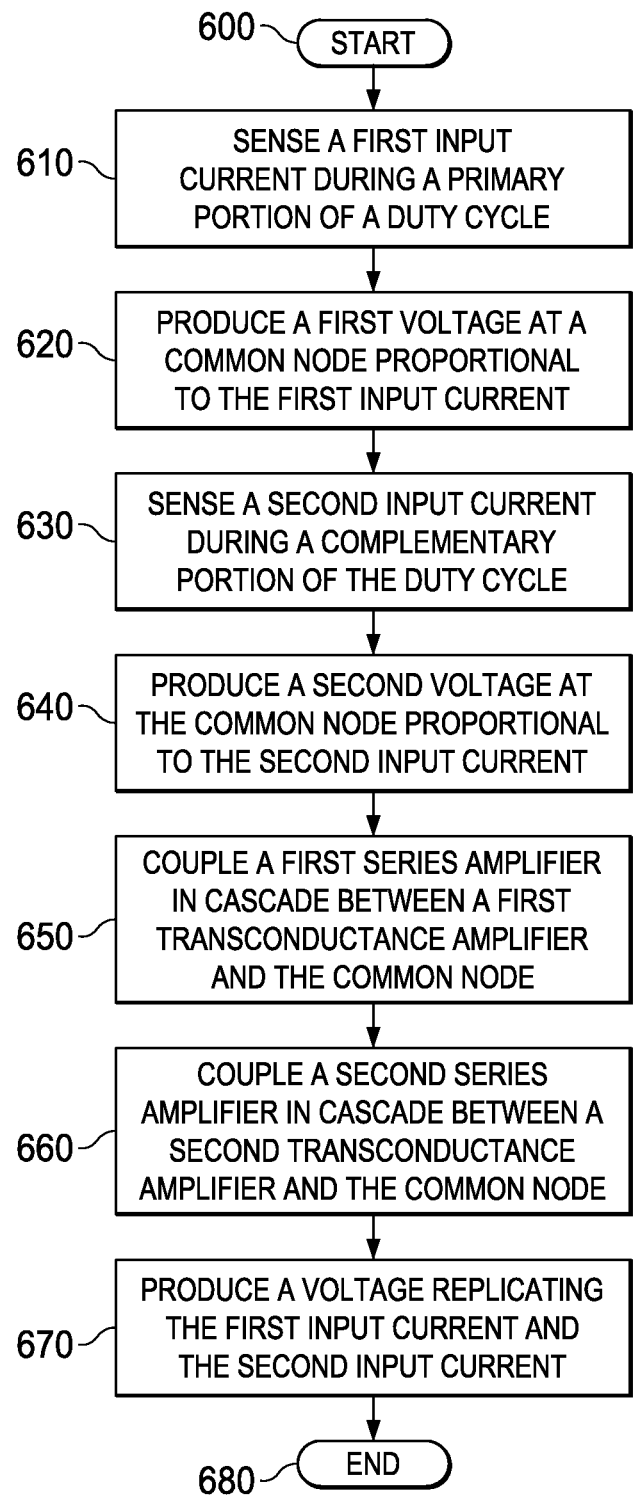
FIG. 6 illustrates a flow diagram of an embodiment of a method of operating an integrated current replicator for a power converter.

Turning now to FIG. 6, illustrated is a flow diagram of an embodiment of a method of operating an integrated current replicator for a power converter. The method begins in a start step or module 600. At a step or module 610, a first input current to the power converter is sensed with a first current sense resistor during a primary portion of a duty cycle of the power converter. At a step or module 620, a first transconductance amplifier is coupled to the first current sense resistor to produce a first voltage at a common node of the integrated current replicator proportional to the first input current during the primary portion of the duty cycle. At a step or module 630, a second input current to the power converter is sensed with a second current sense resistor during a complementary portion of the duty cycle. At a step or module 640, a second transconductance amplifier is coupled to the second current sense resistor to produce a second voltage at the common node proportional to the second input current during the complementary portion of the duty cycle. At a step or module 650, a first series amplifier is coupled in cascade between the first transconductance amplifier and the common node. At a step or module 660, a second series amplifier is coupled in cascade between the second transconductance amplifier and the common node. At a step or module 670, an input of an amplifier is coupled to the common node to produce a voltage replicating the first input current and the second input current at an output of the amplifier from the first voltage and the second voltage. The method ends at step or module 680.

In an embodiment, the voltage replicating the first input current and the second input current is proportional to a first ratio of a resistance of the first current sense resistor to a resistance of a first input resistor to the first transconductance amplifier. The voltage replicating the first input current and the second input current is proportional to a product of the first ratio and a resistance of a current sense monitoring resistor. The voltage replicating the first input current and the second input current may also be proportional to a second ratio of a resistance of the second current sense resistor to a resistance of a second input resistor to the second transconductance amplifier. The first ratio is substantially equal to the second ratio.

The first input resistor and the second input resistor may be formed in the integrated current replicator with substantially identical semiconductor doping and geometries. The first current sense resistor and the second current sense resistor may also be formed as metallic paths in the integrated current replicator. In an embodiment, the first transconductance amplifier includes a common gate amplifier topology formed with matched p-channel metal-oxide semiconductor ("PMOS") transistors. The second transconductance amplifier includes a common base amplifier topology formed with matched N-type bipolar transistors. The common node provides to a negative feedback input to the amplifier. In an embodiment, the first input current flows through a first power semiconductor switch of the power converter, and the second input current flows through second power semiconductor switch of the power converter. The first input current and the second input current flow through an inductor (an output filter inductor) of the power converter. Thus, an integrated current replicator for a power converter formed with first and second transconductance amplifiers coupled respectively to first and second current sense resistors to produce a voltage replicating first and second input currents is introduced that provides highly accurate, temperature-independent sensing of first and second input currents with wide bandwidth.

Those skilled in the art should understand that the previously described embodiments of an integrated current replicator and related methods of operating and constructing the same are submitted for illustrative purposes only. While the integrated current replicator has been described in the environment of power electronics, other applications are well within the broad scope of the present invention.

For a better understanding of integrated circuits, semiconductor devices and methods of manufacture therefor see "Semiconductor Device Fundamentals," by R. F. Pierret, Addison-Wesley (1996), and "Handbook of Sputter Deposition Technology," by K. Wasa and S. Hayakawa, Noyes Publications (1992). For a better understanding of power converters, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht, and G. C. Verghese, Addison-Wesley (1991). The aforementioned references are incorporated herein by reference in their entirety.

Also, although the present invention and its advantages have been described in detail, it should be understood that various changes, substitutions, and alterations can be made herein without departing from the spirit and scope of the invention as defined by claims on embodiments. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, claims on embodiments are intended to include within their scope such processes, machines, manufacture, compositions of matter, means, methods, or steps.

What is claimed is:

1. An integrated current replicator for a power converter, comprising:
   a first current sense resistor configured to sense a first input current to said power converter during a primary portion of a duty cycle thereof;
   a first transconductance amplifier, coupled to said first current sense resistor, configured to produce a first voltage at a common circuit node of said integrated current replicator proportional to said first input current during said primary portion of said duty cycle;
   a second current sense resistor configured to sense a second input current to said power converter during a complementary portion of said duty cycle thereof;
   a second transconductance amplifier, coupled to said second current sense resistor, configured to produce a second voltage at said common circuit node proportional to said second input current during said complementary portion of said duty cycle;
   an output amplifier, coupled to said common circuit node, configured to produce a current replicator output voltage replicating said first input current and said second input current from said first voltage and said second voltage, respectively; and
   a current monitoring resistor electrically coupled to an output of the output amplifier, wherein the current monitoring resistor is configured to receive a monitoring current output from the output amplifier comprising the first input current and second input current, to produce the current replicator output voltage to facilitate monitoring the power convertor.

2. The integrated current replicator as recited in claim 1, further comprising:
a first series amplifier coupled in cascade between said first transconductance amplifier and said common circuit node; and
a second series amplifier coupled in cascade between said second transconductance amplifier and said common circuit node.

3. The integrated current replicator as recited in claim 1 wherein said voltage replicating said first input current and said second input current is proportional to a first ratio of a resistance of said first current sense resistor to a resistance of a first input resistor to said first transconductance amplifier.

4. The integrated current replicator as recited in claim 3 wherein said voltage replicating said first input current and said second input current is proportional to a product of said first ratio and a resistance of a current sense monitoring resistor.

5. The integrated current replicator as recited in claim 3 wherein said voltage replicating said first input current and said second input current is proportional to a second ratio of a resistance of said second current sense resistor to a resistance of a second input resistor to said second transconductance amplifier.

6. The integrated current replicator as recited in claim 5 wherein said first ratio is substantially equal to said second ratio.

7. The integrated current replicator as recited in claim 5 wherein said first input resistor and said second input resistor are formed in said integrated current replicator with substantially identical semiconductor doping and geometries.

8. The integrated current replicator as recited in claim 1 wherein said first current sense resistor and said second current sense resistor are formed as metallic paths in said integrated current replicator.

9. The integrated current replicator as recited in claim 1 wherein said first transconductance amplifier comprises a common gate amplifier topology formed with matched p-channel metal oxide semiconductor ("PMOS") transistors.

10. The integrated current replicator as recited in claim 1 wherein said second transconductance amplifier comprises a common base amplifier topology formed with matched N-type bipolar transistors.

11. The integrated current replicator as recited in claim 1 wherein said common circuit node is configured to provide a negative feedback input to said output amplifier.

12. The integrated current replicator as recited in claim 1 wherein said first input current is configured to flow through a first power semiconductor switch of said power converter, and said second input current is configured to flow through a second power semiconductor switch of said power converter.

13. The integrated current replicator as recited in claim 1 wherein said first input current and said second input current are configured to flow through an inductor of said power converter.

14. A method operable with a power converter, comprising:
during a primary portion of a duty cycle of power switches of the power converter:
sensing a first input current to said power converter using first current-sensing circuitry;
producing a first voltage on a first voltage node, wherein the first voltage is proportional to said first input current; and
receiving the first voltage on the first voltage node and producing an output voltage on an output voltage node, wherein the output voltage replicates the first input current from the first voltage; and
during a complementary portion of the duty cycle of power switches of the power converter:
sensing a second input current using second current-sensing circuitry;
producing a second voltage on the first voltage node, wherein the second voltage is proportional to said second input current; and
receiving the second voltage on the first voltage node and producing the output voltage on the output voltage node, wherein the output voltage replicates the second input current from the second input voltage; and
an output amplifier, coupled to first voltage node, configured to produce a current replicator output voltage replicating said first input current and said second input current from said first voltage and said second voltage, respectively; and
a current monitoring resistor electrically coupled to an output of the output amplifier, wherein the current monitoring resistor is configured to receive a monitoring current output from the output amplifier comprising the first input current and second input current, to produce the current replicator output voltage to facilitate monitoring the power convertor.

15. The method as recited in claim 14 wherein said sensing said first input current to said power converter and producing said first voltage are performed by a first current sense resistor and a first transconductance amplifier, respectively, said voltage replicating said first input current and said second input current being proportional to a first ratio of a first resistance of said first current sense resistor to a second resistance of a first input resistor to said first transconductance amplifier.

16. The method as recited in claim 15 wherein said sensing said second input current to said power converter and producing said second voltage are performed by a second current sense resistor and a second transconductance amplifier, respectively, said voltage replicating said first input current and said second input current being proportional to a second ratio of a third resistance of said second current sense resistor to a fourth resistance of a second input resistor to said second transconductance amplifier.

17. The method as recited in claim 16 wherein said first ratio is substantially equal to said second ratio.

18. The method as recited in claim 14 wherein:
said first input current flows through a first power semiconductor switch of said power converter, and said second input current flows through second power semiconductor switch of said power converter; or
said first input current and said second input current flow through an inductor of said power converter.

19. Power conversion circuitry comprising:
a first power semiconductor coupled between a higher-voltage input node and a first common circuit node;
a second power semiconductor coupled between a lower-voltage input node and the first common circuit node;
an inductor coupled between the first common circuit node and a higher-voltage output node;
a capacitor coupled between the higher-voltage output node and a lower-voltage output node; and
integrated current replication circuitry that senses a first input current through the first power semiconductor and a second input current through the second power semiconductor and produces a voltage replicating the first input current and the second input current based at least in part on the sensed first input current and the sensed second input current, wherein the voltage replicating the first input current and the second input current is produced by an output current of an output amplifier through a current monitoring resistor, and enables control circuitry to generate control signals to control the first power semiconductor and the second power semiconductor.

20. The power conversion circuitry of claim 19, wherein the integrated current replication circuitry comprises at least one transconductance amplifier used in sensing the first input current or the second input current.

* * * * *